United States Patent [19]
Weissenfels et al.

[11] 3,915,772
[45] Oct. 28, 1975

[54] PROCESS FOR THE IMPROVEMENT OF ADHESION OF PROTECTIVE LAYERS TO PHENOLIC RESIN FOAMS

[75] Inventors: Franz Weissenfels; Hans Jünger, both of Troisdorf, Germany

[73] Assignee: Dynamit Nobel AG, Troisdorf, Germany

[22] Filed: Sept. 22, 1972

[21] Appl. No.: 291,431

Related U.S. Application Data

[62] Division of Ser. No. 58,684, July 27, 1970, abandoned.

[30] Foreign Application Priority Data

July 30, 1969 Germany.............................. 1938665

[52] U.S. Cl. .................. 156/79; 156/155; 156/310; 260/2.5 F; 264/53; 264/45.6; 264/DIG. 2; 428/314; 428/318
[51] Int. Cl.² ........................................... B32B 5/20
[58] Field of Search ............ 260/2.5 F; 264/DIG. 2, 264/53, 45.6; 156/79, 310, 155; 161/160, 161

[56] References Cited
UNITED STATES PATENTS

| | | | |
|---|---|---|---|
| 2,376,653 | 5/1945 | Boyer.................................... | 161/39 |
| 3,300,419 | 1/1967 | Erickson............................ | 260/2.5 F |
| 3,389,095 | 6/1968 | Garrett.............................. | 260/2.5 F |
| 3,415,714 | 12/1968 | Hider................................. | 156/79 X |
| 3,484,256 | 12/1969 | Chio et al. .......................... | 99/171 |
| 3,502,539 | 3/1970 | MacPhail........................... | 161/160 |
| 3,726,708 | 4/1973 | Weissenfels ....................... | 117/76 P |
| 3,726,951 | 4/1973 | Smith et al. ....................... | 260/2.5 F |

*Primary Examiner*—Edward G. Whitby
*Attorney, Agent, or Firm*—Burgess, Dinklage & Sprung

[57] ABSTRACT

Improved shaped articles, particularly sheets or slabs, of phenolic resin foam having a covering material adhered to at least one side thereof which covering material is a fiber-containing, porous and water vapor permeable material which has impregnated into at least the side thereof to be adhered to the foam: phenolaldehyde liquid condensation product; or solutions or dispersions of polyamides, polybutadienes and/or polyvinyl acetal.

11 Claims, No Drawings

PROCESS FOR THE IMPROVEMENT OF ADHESION OF PROTECTIVE LAYERS TO PHENOLIC RESIN FOAMS

This is a division of application Ser. No. 58,684, filed July 27, 1970, now abandoned.

This invention relates to the improvement of adhesion of protective layers of phenolic resin foams. It more particularly refers to such improved adhesion coupled with simultaneous decrease of the water vapor permeability of the phenolic resin covered with such protective layer.

A protective covering for phenolic resin foams should satisfy several requirements: it should, as much as possible, be impervious to external water vapor, but simultaneously be able to let the volatile constituents pass through during the hardening process. Furthermore, the protective covering should be tightly bound to the foam and not chip off or be easily separable from it. Impregnated paper, plastic or metal foils, for example, are suited as materials extensively employed to impart water vapor impermeability. These materials, however, have the disadvantage that usually they only combine with the foam with difficulty since they prevent the volatile constituents generated and existant during the hardening process from diffusing out of the foam.

By comparison, porous, water vapor permeable, fiber containing cover materials, e.g., pasteboard, soda kraft paper or mats or the like adhere to phenolic resin foams to a certain extent. However, these materials come off the phenolic resin foams with the application of stronger mechanical stress, whereby the outside protection of the foam is removed. Such products suffer from the additional disadvantage that the water vapor permeability of the porous and fiber containing cover materials is so high that sheets of phenolic resin foam covered with these materials are unsuited for use as outside insulations.

It is, therefore, an object of this invention to provide an improved covering material for phenolic resin foam articles.

It is another object of this invention to provide an improved covered phenolic resin foam composit article.

Other and additional objects of this invention will become apparent from a consideration of this entire specification including the claims hereof.

In accord with and fulfilling these objects, one aspect of this invention resides in covering a phenolic resin foam with a covering material which is a fiber containing and water vapor permeable material of the type set forth above which has been impregnated with:

a. a liquid condensation product of a phenol and an aldehyde, which may additionally contain a suitable hardener;
b. a solution or a dispersion of a polyamide;
c. a solution or a dispersion of a butadiene polymer; and/or
d. a solution or dispersion of a polyvinylacetal.

The covering material is so impregnated at least on the side thereof to be bonded to the phenolic resin foam. The thus impregnated covering material of this invention has substantially improved adhesion as compared to this same covering material which was not so impregnated.

The thus impregnated covering material is bonded to the phenolic resin at the foaming temperature either during or directly following the foaming thereof, and then the phenolic resin foam, provided with the covering, is hardened in a known manner at pressure of between about 0.01 and 2.0 kp/cm$^2$.

Surprisingly, impregnation of the covering material according to this invention has caused the adhesive strength of the above described protective covering materials to the phenolic resin foam to be significantly improved and simultaneously has caused water vapor permeability of the laminated composit phenolic resin foam product to be reduced.

The phenol-aldehyde condensation products should be liquid as set forth above. Such condensates are resols, which are formed by the condensation of one mole of a phenol, possibly alkyl substituted, with from 1 to 3 moles of an aldehyde in alkaline medium followed by distilling off the water formed in the condensation to an extent sufficient to achieve the desired solid resin content. In considering which resols are applicable to this invention, care should be exercised to choose only those which are impregnatable into the covering material hereof. It is of course within the scope of this invention to include a conventional hardener in the liquid phenolaldehyde condensation product.

Polyamides formed through the condensation polymerization of diamines and dicarboxylic acids or through the condensation polymerization of $\omega$- aminocarboxylic acids or through the polymerization of corresponding lactams can be employed as polyamides. $\omega$-Aminoundecanoic acid is mentioned as an example of an $\omega$-aminocarboxylic acid, caprolactam is exemplary of a preferred lactam, and hexamethylene diamine and adipic acid are illustrative of the first above mentioned type of polyamide. Nylon 11, nylon 6 and nylon 66 respectively are formed from these illustrative materials. An example of another condensation product of diamines and dicarboxylic acids is nylon 6,10 (from hexamethylenediamine and sebacic acid).

Also condensation products of ethylenediamine or polyethylenediamine with higher branched, unsaturated dicarboxylic acids having a mole ratio of amine: acid $\geq$ 1 can be employed according to the invention. These products are known as polyaminoamides. Examples of the dicarboxylic acids useful for these polyaminoamides are linoleic acid, linolenic acid, ricinic acid or eleostearic acid.

In addition to the previously named substances, ether alcohols, such as ethyl cellosolve or butyl cellosolve and ketones, such as methyl ethyl ketones and acetone as well as mixtures of these compounds together are suitable as solvents for the polyamino amides.

Aliphatic mono- and poly-valent alcohols with preferably to about 8 carbon atoms such as for example, methanol, n-butanol, n-propanol, heptanol or ethylene glycol, 1,3-butylene glycol or glycerine are suitable as solvents for the polyamides. Mixtures of these solvents can be used as can mixtures thereof with water. Known aromatic materials can also be used as solvents such as benzene toluene, xylene, phenol, cresols or xylenols, etc. These can be used alone or, preferably, in mixtures with the other solvents set forth above.

One obtains good results from using binary or ternary mixed polyamide condensates, such as the mixed condensate of polyamide-6 with polyamide 6,6 in ratio 75:25 to 35:65; or of polyamide-6 with polyamide-6, 10 in ratio 70:30 to 50:50; or of polyamide-6 with polyamide-6,6 and polyamide-6, 10 in which the portion of polyamide-6 amounts to at least 20 parts by weight.

Other condensation products such as alkyl esters of p-hydroxybenzoic acid or n-alkylamides of benzenesulfonic acid can be added to the polyamide in order to improve the solubility thereof.

The butadiene polymers of this invention may be based upon butadiene, piperylene, isoprene, chloroprene, etc. While solution of these polymers can be used in this invention, it is more common to utilize this type of polymer as an emulsion or latex thereof. As such the polymers can be formed by emulsion polymerization and then directly used in the same latex. Where solutions are used, suitable solvents include alkyl-acetates, such as methyl or ethyl acetate.

The polyvinyl-acetals are exemplified by the acetals, -formals, and butyrals. These polymers are soluble in lower aliphatic alcohols and other known materials. These are, illustrated by methanol, ethanol, n-butanol, i-propanol, etc.

The fiber containing, water vapor permeable, porous covering material of this invention is illustrated and exemplified by a highly absorbent paper such as pasteboard or soda kraft paper. Organic and inorganic, synthetic and natural fibers can be employed as fabric and mats from which such paper is made.

The impregnation of these covering materials can be performed by conventional techniques such as brushing or spraying with the solutions, emulsions or melts of the impregnating medium.

A special procedure for impregnation of the covering material can be carried out by using phenolic resin compositions which contain a defoaming agent as follows: first a foamable phenolic resin is quickly foamed in a suitable cavity in such manner that it wets the cavity wall surfaces, then, due to instability, the foam collapses and thereafter foams up again, except that this second foaming is accompanied by a hardening process so that they take place synchronously, whereby the resulting foam is stabilized and is joined very firmly to that portion of the phenolic resin which is wetting the cavity walls. All of the phenolic resin hardens at the same speed. If phenolic resin without defoamer is employed, the mold cavity is lined with the impregnated covering material in a first process step and then the phenolic resin is foamed in this lined mold.

When a phenolic resin foam is being prepared by a continuous process, in a double band press for example, and such foam is to be covered with a suitable covering material according to this invention, the procedure is as follows: the two webs of the covering material, which are fed to the double band press, are made to approach one another, at the point where the liquid, foamable phenolic ressin mixture is introduced, to such an extent that the upper web as well as the lower web is wetted with the phenolic resin mixture. Then the two webs make contact with the upper or lower band, as the case may be, of the double band press, and the phenolic resin foam rising from the lower web bonds to the previously impregnated upper web.

According to the invention alkaline medium condensation products of 1 mole of phenol with 1 to 3; moles of aldehyde are defined as understood foamable phenolic. In addition to phenol, its homologs and alkyl substituted products can also be employed such as for example, resorcinol, pyrocatechol, the cresols or xylanols or mixtures of these compounds. The aldehydes reacting with phenols include among others, formaldehyde, compounds decomposable into formaldehyde (e.g., paraformaldehyde or trioxane), acetaldehyde, furfural and hexamethylenetetramine as well as mixtures of these compounds.

After the condensation of both reactants, the condensation reaction mixture containing water is distilled, preferably under vacuum, until a suitable solid content (50 to 80%) with a viscosity range between 2000 and 10,000 centipoises is attained. The pH value of the product is adjusted to a suitable level. One preferred pH is 4.

The foaming hardening of the phenolic resin of this invention is performed in a known manner through the addition of a known blowing agent and hardener. The following are known as preferred blowing agents: chlorofluoromethane, n-pentane, petroleum ether, methylene chloride or ethylene chloride. But for example, alkali and alkaline earth carbonates can be employed as solid blowing agents. Aromatic sulfonic acids are preferred hardeners, e.g., p-toluene sulfonic acid. Other available hardeners include, e.g., hydrochloric acid, sulfuric acid or phosphoric acid.

The phenolic resins to be foamed may also contain a modifying medium such as for example, high boiling esters or low molecular weight polyesters (e.g., dibutyl phthalate) and addition products of ethylene oxide onto a phenol.

The following Examples are illustrative of this invention and are in no way to be considered as limiting thereon:

EXAMPLE 1

A liquid, foamable phenolic resin mixture was prepared in a continuous proportioning and mixing machine. This mixture consisted of 100 parts by weight of phenol-formaldehyde resin (prepared through condensation of 143 part by weight of phenol with 228 parts by weight of a 30% aqueous formaldehyde solution with addition of 0.715 parts by weight of NaOH at 100°C followed by distilling off the water to a solid content of about 76%), 6.8 parts by weight of n-pentane as blowing agent and 30.2 parts by weight of hardener, consisting of 10.0 parts by weight of finely pulverized p-toluenesulfonic acid, 20.0 parts by weight of finely pulverized boric acid and 0.22 parts by weight of $SiO_2$.

Soda Kraft webs were first impregnated in a separate operation, on the side which will later face the foam resin mixture, with 200 to 300 $g/m^2$ of a solution of polychloroprene in ethyl acetate (solid content 20 to 25%, viscosity according to Epprecht of 600 to 800 centipoises).

This phenolic resin mixture was fed between two of the previously impregnated soda Kraft paper webs, coming off supply rolls, (unimpregnated weight 150 $g/m^2$) at an extrusion rate of about 2.5 kg/minute and the whole passed through a double band press 12 meters long having lateral limits and a clearance between upper and lower bands of 25 mm. The said press was heated to 70°C.

The liquid phenolic resin mixture, during the passage through the press accompanied by foaming and filling up of the given cavity stuck to the upper soda Kraft paper web and hahrdened within 12 minutes. After leaving the double band press, the laminate was cut to size by conventional means such as side and cross cutters.

The adhesion strength of this impregnated covering material to the phenolic resin foam was determined each time by stripping experiments on 4 specimens each 300 mm wide. At the beginning of each test, about 5 cm of the impregnated covering material was detached for clamping in the test arrangement. Stripping continued at the rate of 100 mm/minute. The forces which are necessary for the stripping are given in the following table. The single values were determined from a force-time diagram determined from the stripping test date.

Table 1

| Soda Kraft Paper | Stripping Test - Adhesion (kp) | |
|---|---|---|
| | Without impregnation | Impregnated with Polychloroprene Solution |
| Top | 0.65 (0.60 – 0.70) | 2.2 (1.4 – 3.0) |
| Bottom | 0.67 (0.64 – 0.70) | 0.78 (0.74 – 0.9) |
| Density | 0.08 | 0.06 |

EXAMPLE 2

In a cavity mold with a bottom surface of 50 cm and a depth of 100 cm, which was clamped to a support apparatus sufficient to contain the foam pressure, there was placed a foamable phenolic resin mixture, consisting of 2.5 kg of phenolic resin of composition as in Example 1, 125 ml of monofluorotrichloromethane and 125 ml methylenechloride as blowing agent, 6 g silicone defoaming agent (40% solution of a commercially available modified dimethylpolysiloxane) and 250 ml hardener (composed of 40 parts by weight of water and 20 parts by weight of concentrated $H_2SO_4$). 2 minutes after bringing the components together the mixture began to foam at a temperature of 25° to 30°C. The foam rose quickly to just below the upper edge of the cavity, collapsed and about 1 minute later begins to foam again. This latter foaming process proceeded more slowly than the first. After 5 to 10 minutes the cavity was filled with phenolic resin foam. At this time the mold was heated to a temperature of 40° to 60°C and held there in order to accelerate the final hardening.

For comparison, the above named mixture without the silicone defoaming agent was foamed in the same mold. This mixture filled the mold completely when it first foamed up and did not collapse.

In each case, the mold was lined with soda Kraft paper (weight: 150 g/m²). The determination of the adhesion of the covering material to the phenolic resin foam was carried out in the same manner as that described in Example 1. The general data is set forth in the following Table 2.

TABLE 2

| Soda Kraft Paper | Stripping Test - Adhesion (kp) | |
|---|---|---|
| | Without Defoamer | With Defoamer |
| Side 1 | 0.60 (0.55 – 0.67) | 0.95 (0.89 – 1.00) |
| Side 2 | 0.62 (0.55 – 0.69) | 1.10 (0.90 – 1.20) |
| Density of Foam | 0.072 | 0.08 |

The soda Kraft paper used was not impregnated as set forth in Example 1. Rather, the initial foam generation in the foaming composition containing defoamer acted to impregnate the paper with the foaming phenolic resin before this initial foam collapsed. Thus, when the collapsed foam rose as a form, it adhered to the pre-impregnated soda Kraft paper with greater tenacity than in the case where no defoamer was used.

We claim:

1. A process of forming a composite laminate of a hardened phenolic resin foam and a fiber containing water vapor impermeable covering material which comprises:
   A. Rapidly foaming a liquid phenol-aldehyde condensation product which contains a defoaming agent in its composition below a covering material to be impregnated thereby impregnating said covering material;
   B. Collapsing the initial foam so formed;
   C. Foaming the so collapsed foam whereby the phenolic resin foam produced by the second foaming bonds to covering material; and
   D. Hardening said foam covering material composite.

2. A process according to claim 1, wherein a silicone defoaming agent has been incorporated in said liquid phenol resin.

3. A process according to claim 1 wherein the impregnant polymer is polyisoprene.

4. A process for preparing an improved water impermeable composite laminate of a hardened foam-form phenolic resin adhered to a fiber-containing porous, water vapor permeable covering material impregnated, at least on the side facing said resin, which comprises:
   A. Impregnating a fiber-containing covering material on the side that said covering material is to be bonded to phenolic resin foam with an impregnating agent selected from the group consisting of
      1. a liquid condensation product of a phenol aldehyde,
      2. a solution or dispersion of a polyamide,
      3. a solution or dispersion of a polymer of butadiene, or
      4. a solution or dispersion of a polyvinyl acetal
   to thereby form a water vapor impermeable impregnated covering material;
   B. Continuously feeding the thus impregnated protective layer into a double band press so that said impregnated protective layer runs parallel and horizontal to a base layer of a water vapor permeable material disposed therebeneath and against said impregnated protective layer within said region foaming a liquid foamable, phenolic resin mixture on said base layer;
   C. Allowing said phenolic resin during foaming to contact said impregnated protective layer; and
   D. Hardening said phenolic resin foam in contact with said covering material at a pressure generated by the foam of between 0.01 and 2.0 kp/cm².

5. A process according to claim 4 wherein said covering material is soda Kraft paper.

6. A process according to claim 4 wherein said phenol-aldehyde condensation product is the alkaline catalyzed condensation product of 1 mol of a phenol selected from the group consisting of phenol, resorcinol, pyrocatechol, xylenol and cresol, and 1 to 3 mols of an aldehyde selected from the group consisting of formaldehyde, acetaldehyde and furfural.

7. A process according to claim 4 wherein said phenolic resin contains as a hardener a member selected from the group consisting of p-toluene sulfonic acid, hydrochloric acid, sulfuric acid and phosphoric acid.

8. A process according to claim 4 wherein said polyamide is a member selected from the group consisting of polyundecanoamide, polycaproamide, polyhexamethylene adipamide, hexamethylene sebacamide, polyethylene linoleamide, ethylene linolen amide, ethylene vicinamide and ethylene eleostearamide.

9. A process according to claim 4 wherein said polyamide impregnant has a composition selected from the group consisting of 75:25 to 35:65 nylon 6 to nylon 66; 7:30 to 50:50 nylon 6 to nylon 610; and a mixture of at least 20 parts by weight of nylon 6 with nylon 66 and nylon 610.

10. A process according to claim 4 wherein said polybutadiene is a member selected from the group consisting of polybutadiene, polyisoprene, polychloroprene and polypiperylene.

11. A process according to claim 4 wherein said polyvinyl acetal is a member selected from the group consisting of polyvinyl formal, polyvinyl acetal and polyvinyl butyral.

* * * * *